(12) United States Patent
Yan

(10) Patent No.: US 11,513,528 B2
(45) Date of Patent: Nov. 29, 2022

(54) VIRTUAL WALL DEVICE AND ROBOT AND CONTROL METHOD THEREOF

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 196 days.

(21) Appl. No.: 16/864,091

(22) Filed: Apr. 30, 2020

(65) Prior Publication Data

US 2021/0341938 A1 Nov. 4, 2021

(51) Int. Cl.
*G05D 1/02* (2020.01)

(52) U.S. Cl.
CPC ........... *G05D 1/0225* (2013.01); *G05D 1/028* (2013.01); *G05D 1/0242* (2013.01); *G05D 1/0255* (2013.01); *G05D 2201/0203* (2013.01)

(58) Field of Classification Search
CPC .. G05D 1/0225; G05D 1/0242; G05D 1/0272; G05D 1/028; G05D 2201/0203
See application file for complete search history.

(56) References Cited

U.S. PATENT DOCUMENTS

| 8,749,196 | B2 | 6/2014 | Cohen et al. | |
|---|---|---|---|---|
| 2007/0267798 | A1* | 11/2007 | Bonkowski | B25B 5/10 269/101 |
| 2007/0267998 | A1* | 11/2007 | Cohen | H02J 7/0029 320/109 |
| 2010/0082193 | A1* | 4/2010 | Chiappetta | A47L 9/2894 455/127.1 |

* cited by examiner

*Primary Examiner* — Anne Marie Antonucci
*Assistant Examiner* — Jared C Bean
(74) *Attorney, Agent, or Firm* — Chun-Ming Shih; HDLS IPR Services

(57) ABSTRACT

A method for docking a robot at a charging station includes the following steps: the charging station outputs a first transmitting signal and a second transmitting signal, wherein an overlapping zone and two non-overlapping zones are formed within the signal transmission range of the first and second transmitting signals, and a blank zone forms within a predetermined distance. When the robot needs to move to the charging station, the robot detects its entry into the overlapping zone or one of the two non-overlapping zones, and the robot moves in the direction of the charging station by alternately moving in and out between the overlapping zone and one of the two non-overlapping zones until the robot moves to the blank zone, then the robot either moves directly towards the charging station, or rotates and then moves backwardly towards the charging station, thereby allowing the robot to dock at the charging station.

4 Claims, 7 Drawing Sheets

VIRTUAL WALL DEVICE AND ROBOT AND CONTROL METHOD THEREOF

FIELD OF THE INVENTION

The invention relates to a robot, and more particularly, to a robot which can move to a charging station for charging by using transmitting signals of the charging station when the robot needs to be charged.

DESCRIPTION OF THE PRIOR ART

In recent years, the fast-developing robot industry has made robotic products more and more common in daily life, especially the cleaning robots (automatic sweeping or mopping robots), whose sales are increasing year by year and still have a lot of room for growth; therefore, many companies are investing in this field and are constantly developing new technologies.

For example, most of the cleaning robots run on rechargeable batteries. In order to enable the cleaning robot to automatically move to the charging station to recharge with the remaining power before the rechargeable battery is exhausted to cause the robot to shut down, thus making it inconvenient for the user to find the cleaning robot since it could stop at anywhere. Therefore, many robotic companies have proposed solutions to this problem, for example, in the 31st column of the 13th paragraph of the U.S. Pat. No. 8,749,196 filed by iRobot Corporation, the charging station (base station) is equipped with a right signal transmitter and a left signal transmitter. The robotic device enters the signal range of the right signal or the left signal emitted by the right signal transmitter or the left signal transmitter when it needs to be charged, and then moves in the direction of the overlapping zone of the right signal and the left signal. Thereafter, the robot enters the overlapping zone and follows a path to approach the charging station, wherein at least a portion of this path is within the overlapping zone.

The path of the above-mentioned robot moving to the charging station is limited to the overlapping zone of the right signal and the left signal to follow the path, and the overlapping zone of the right signal and the left signal needs to be quite close to the charging station, so that the front and rear axes of the robot can be aligned with the charging station. In other words, the charging station needs to specify that the transmitter of a specific specification is selected and installed in a position limited to the extent that the robot can move to the overlapping zone, and the front and rear axis directions of the robot are aligned with the charging station. The prior art technique has limited the way the robot moves, so it is necessary to provide alternative solutions so that the robot does not have to move to the overlapping zone to accurately move to the charging station for charging.

SUMMARY OF THE INVENTION

In view of the problems of the prior art, the object of the present invention is to allow a robot to approach the charging station with multiple paths and to perform the charging procedure.

According to an object of the present invention, the present invention provides a method for docking a robot with a charging station, which is applied between a robot and a charging station, and the charging station outputs two transmitting signals, the transmitting range of the two transmitting signals is at a predetermined distance in front of the charging station to form an overlapping zone and two non-overlapping zones, and a blank zone of the two transmitting signals is formed within the predetermined distance. The robot detects that the robot has entered the overlapping zone or the non-overlapping zone when the robot is moving to the charge station, then the robot moves in the direction of the charging station by alternately moving in and out between the overlapping zone and one of the non-overlapping zones, then the robot moves directly towards the charging station until the robot arrives at the blank zone, or the robot moves into the blank zone and then rotates and moves backwardly towards the charging station, thereby allowing the robot to dock at the charging station.

The charging station has two signal transmitters for transmitting signals respectively, wherein the signal transmitters can be RF signal, infrared signal or ultrasonic signal transmitters.

Each transmitting signal has different identification features, and each one of the identification features can be a different code, signal frequency, or signal phase. Each identification feature is provided for the robot to identify each transmitting signals.

Wherein, multiple paths can be formed in the moving way of the robot moving towards the charging station and alternately moving in and out between the overlapping zone and one of the non-overlapping zones. In detail, when the robot enters a first non-overlapping zone, the location of a second non-overlapping zone can be determined, and then the robot moves towards the overlapping zone and the charging station. Once the robot detects the entry into the overlapping zone, the robot further moves towards the first non-overlapping zone and the charging station, and alternately moves in and out between the overlapping zone and the first non-overlapping zone until the robot arrives at the blank zone. At this time, the robot then either moves directly towards the charging station, thereby allowing the robot to dock at the charging station, or the robot moves into the blank zone and then rotates and moves backwardly towards the charging station, so that the robot can effectively dock at the charging station.

Wherein, multiple paths can be formed in the moving way of the robot moving towards the charging station and alternately moving in and out between the overlapping zone and one of the non-overlapping zones. In detail, when the robot enters a first non-overlapping zone, the location of a second non-overlapping zone can be determined, and then the robot moves towards the second non-overlapping zone and the charging station, until the robot detects the entry into the second non-overlapping zone, then the robot moves towards the overlapping zone and the charging station; when the robot detects the entry into the overlapping zone, the robot moves back towards the first non-overlapping zone and the charging station, and alternately moves in and out between the overlapping zone and the non-overlapping zones until the robot arrives at the blank zone. At this time, the robot then either moves directly towards the charging station, or the robot moves into the blank zone and then rotates and move backwardly towards the charging station, so that the robot can effectively dock at the charging station.

Wherein, multiple paths can be formed in the moving way of the robot moving towards the charging station and alternately moving in and out between the overlapping zone and one of the non-overlapping zones. In detail, when the robot enters the overlapping zone, and moves continuously to either one of the two non-overlapping zones, so as to determine the location of the entered non-overlapping zone and the overlapping zone. The robot moves alternately in and out between the overlapping zone and the previously entered non-overlapping zone until the robot moves to the blank zone. At this point, the robot then either moves directly towards the charging station, thereby allowing the robot to dock at the charging station, or the robot moves into the blank zone and then moves backwardly towards the charging station, allowing the robot to dock at the charging station.

In summary, the present invention has one or more of the following advantages:
1. The robot is able to provide a different moving path of moving to the charging station compared with the prior art.
2. The robot has multiple paths to move to the charging station.
3. The specifications and the location of transmitters of the charging station are no longer limited in order to cooperate with the technical features specified in the prior art. However, there are other available choices of the specifications and locations.

BRIEF DESCRIPTION OF THE DRAWINGS

The figures provided below are for illustration purpose only. They are not intended to impose any limitation on the present invention, and should not be construed as such either.

DETAILED DESCRIPTION OF THE INVENTION

The invention will be described with reference to the accompanying drawings, and the embodiments of the present invention are described in detail below, and the drawings used in the context are used to describe the features, the contents and the advantages of the invention. The drawings of the present invention are intended to be illustrative only and to assist the description in the specification, and are not intended to limit the scope of the invention in practice.

Figure 1:
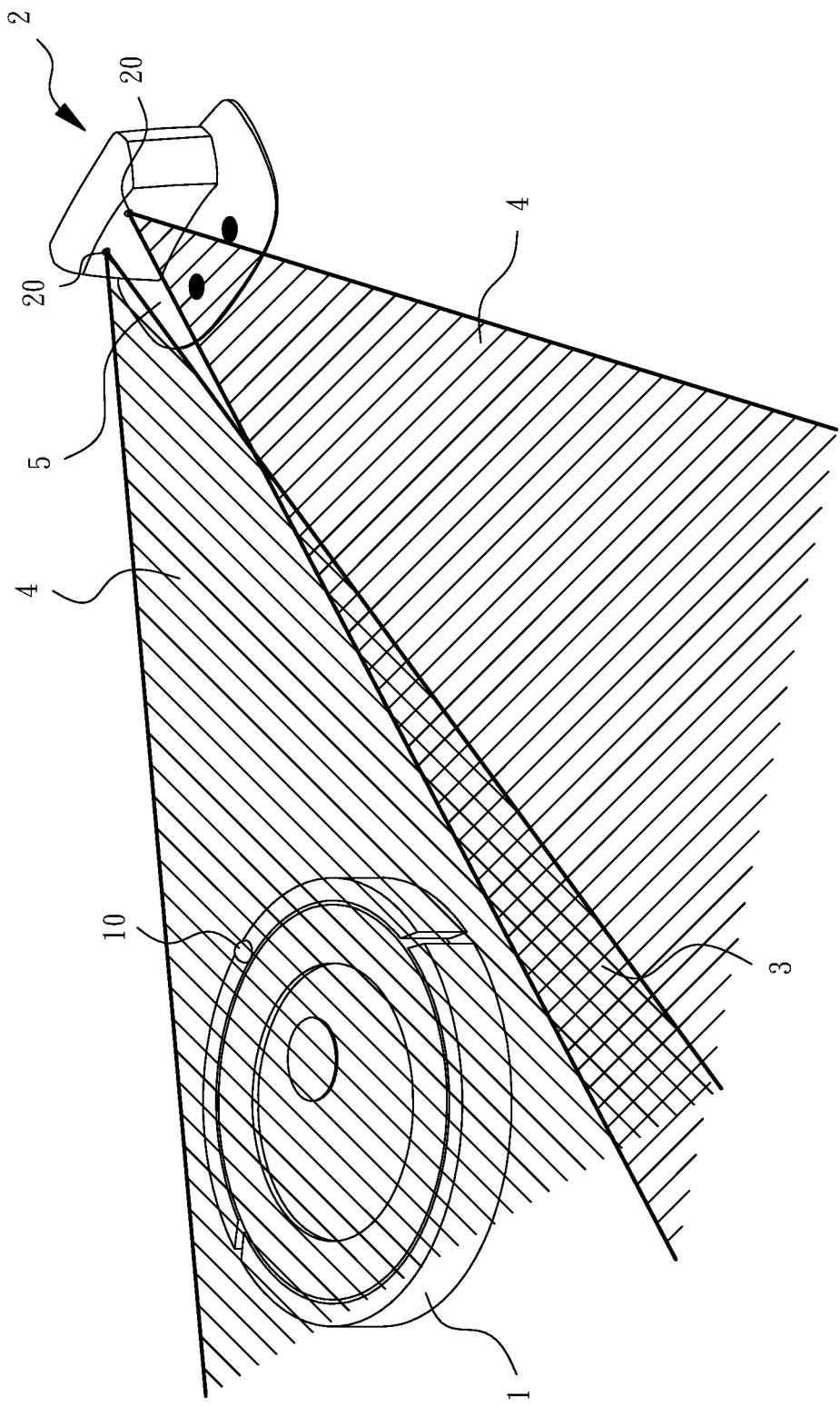
FIG. 1 a schematic view of a robot and a charging station of the present invention.
Figure 2:
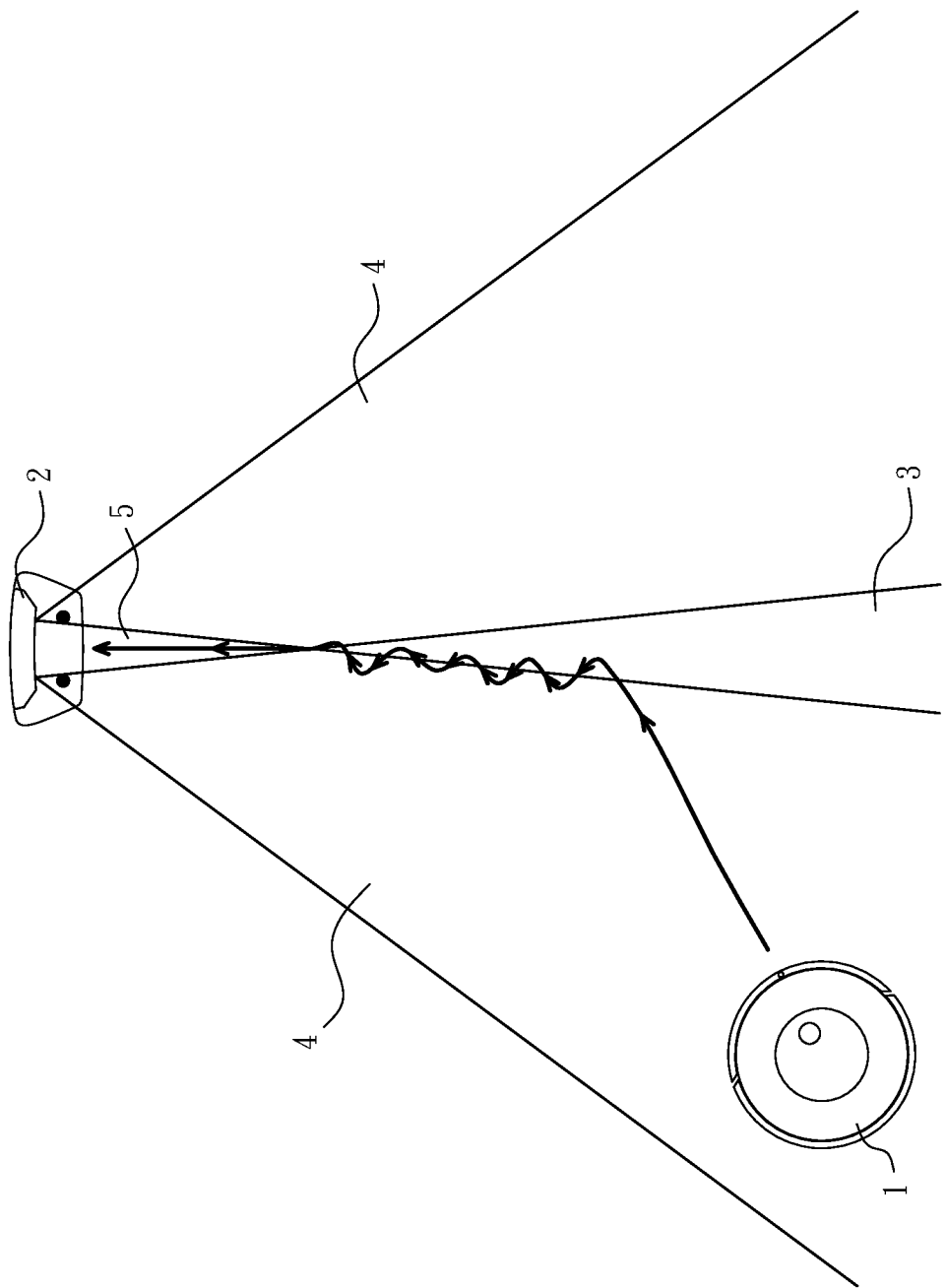
FIG. 2 a schematic view showing the robot movement of a first embodiment of the present invention.

Please refer to FIG. 1 and FIG. 2, the present invention provides a method for docking a robot 1 with a charging station 2, which is applied between the robot 1 and the charging station 2, wherein the charging station 2 has two signal transmitters 20 for outputting transmitting signal respectively. The signal transmitter 20 can be a signal transmitter which transmits signals such as an RF signal, an infrared signal or an ultrasonic signal, but is not limited thereto. Each one of the transmitting signals has different identification features, wherein the identification features of the transmitting signals can be different codes, different frequencies or signal phases, so that the robot 1 can distinguish the identification of transmitting signals. Moreover, the transmission range of the two transmitting signals forms an overlapping zone 3 and two non-overlapping zones 4 at a predetermined distance in front of the charging station 2, and a blank zone 5 of the two transmitting signals is formed within the predetermined distance.

Furthermore, the robot 1 is provided with a signal sensor 10 that senses the transmitting signals. The signal sensor 10 is generally disposed on the top and heading toward the moving direction of the robot 1. When the robot 1 needs to move to the charging station, the robot 1 detects one of the transmitting signals by the signal sensor 10 while moving, indicating that the robot 1 enters into one of the non-overlapping zones 4; when the robot 1 simultaneously detects two transmitting signals by the signal sensor 10 while moving, indicating that the robot 1 enters the overlapping zone 3, no matter the robot 1 enters the overlapping zone 3 or the non-overlapping zone 4 first, the robot moves towards the charging station 2 and alternately moves in and out between the overlapping zone 3 or the non-overlapping zone 4, until the robot 1 detects none of the transmitting signals, indicating that the robot 1 moves into the blank zone 5, then the robot 1 moves directly towards the charging station 2 to dock at the charging station 2, or the robot 1 rotates and moves backwardly towards the charging station 2, thereby allowing the robot 1 to dock at the charging station 2. In other words, when the robot 1 needs to move to the charging station 2, no matter the robot 1 first enters the overlapping zone 3 or the non-overlapping zone 4, the traveling path of the robot 1 can be said to be along any side edge of the overlapping zone 3, in order to allow the robot 1 to alternately move in and out between the overlapping zone 3 and the non-overlapping zone 4 repeatedly, until the robot 1 moves into the blank zone 5, i.e., moving directly towards the charging station 2 so as to allow the robot 1 to dock at the charging station 2.

Figure 3:
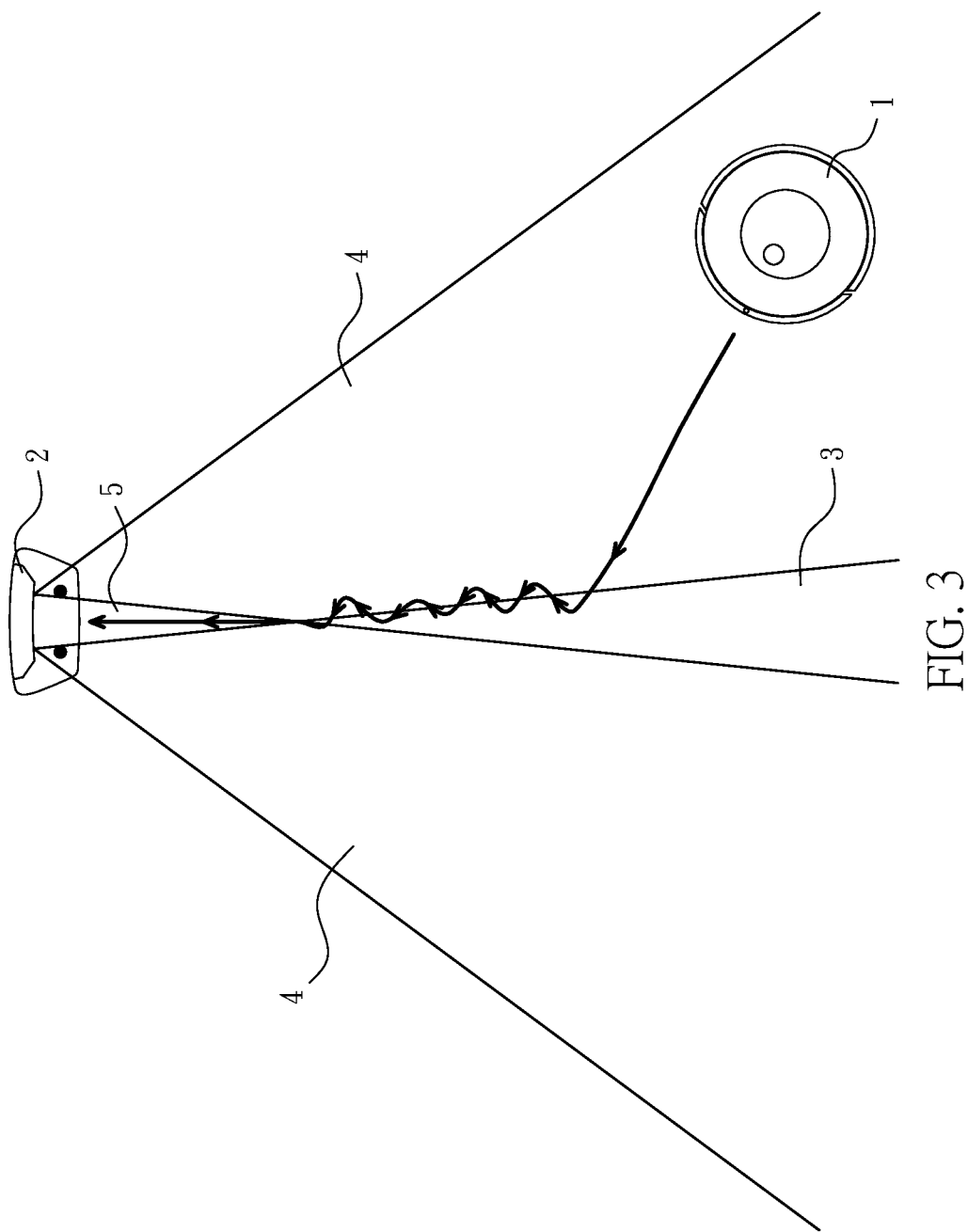
FIG. 3 a schematic view showing the robot movement of a second embodiment of the present invention.

In order to better understand the movement of the robot 1 of the present invention, suppose that the robot 1 may move along with any side edge of the overlapping zone 3, and alternately move in and out between the overlapping zone 3 and the non-overlapping zone 4 towards the charging station 2, which is described as follows:

In the first and second embodiments of the present invention, as shown in FIGS. 2 and 3, the charging station 2 is provided with a right signal transmitter 20 and a left signal transmitter 20, and the right signal transmitter 20 emits a right transmitting signal, the left signal transmitter 20 emits a left transmitting signal. The robot 1 moves towards the charging station 2 and alternately moves in and out between the overlapping zone 3 and the non-overlapping zone 43. When the robot 1 enters the non-overlapping zone 43 of the left transmitting signal or the right transmitting signal, the location of the overlapping zone 3 and the non-overlapping zone 4 can be confirmed, thereby allowing the robot 1 to move in the direction of the overlapping zone 3 and the charging station 2, and then the robot 1 detects the entry into the overlapping zone 3 while moving, and is further re-oriented to move towards the direction of the previous non-overlapping zone 43 and the charging station 2, and alternately moves in and out between the overlapping zone 3 and the same non-overlapping zone 43 as aforesaid, until the robot 1 moves to the blank zone 5. At this point, the robot 1 then moves either directly towards the charging station 2, thereby allowing the robot 1 to dock at the charging station 2, or rotates and then moves backwardly towards the charging station 2 while the robot 1 entering the blank zone 5, so that the robot 1 can dock at the charging station 2.

Figure 4:
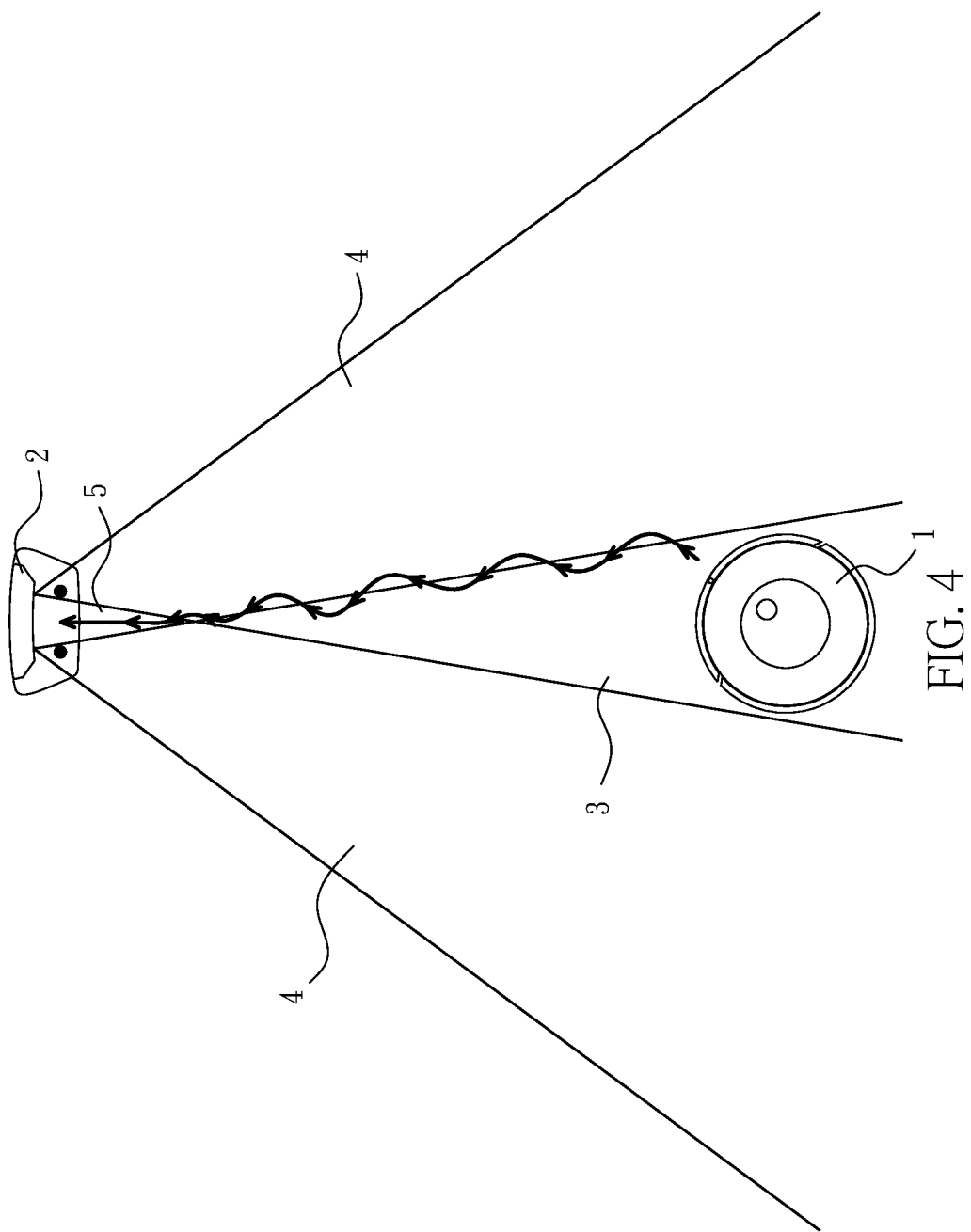
FIG. 4 a schematic view showing the robot movement of a third embodiment of the present invention.
Figure 5:
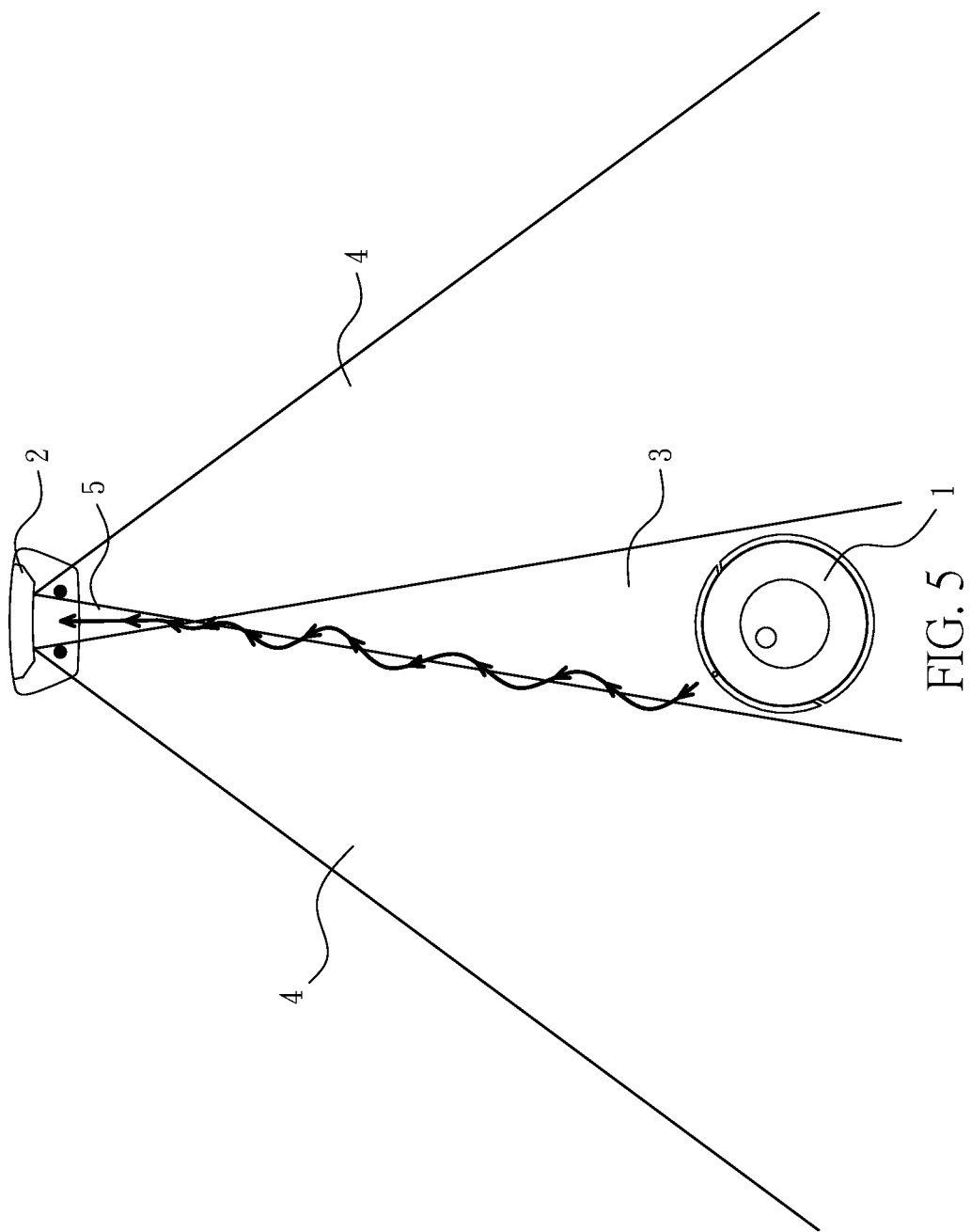
FIG. 5 a schematic view showing the robot movement of a fourth embodiment of the present invention.

In the third and fourth embodiments of the present invention, as shown in FIGS. 4 and 5, the third and fourth embodiments differ from the first and second embodiments in that the robot 1 first enters the overlapping region 3 and determines the location of the current non-overlapping zone 43 and the overlapping zone 3, the robot 1 chooses to proceed to one of the non-overlapping zones 43, afterwards the robot 1 detects the entry into the non-overlapping zone 43, and then moves towards the overlapping zone 3 and the charging station 2, and the robot alternately moves in and out between the overlapping zone 3 or the non-overlapping zone 43 until the robot 1 moves to the blank zone 5, that is, moves directly towards the charging station 2, thereby allowing the robot 1 to dock at the charging station 2, or the robot 1 moves to the blank zone 5 and then rotates and moves backwardly towards the charging station 2, so that the robot 1 can dock at the charging station 2.

Figure 6:
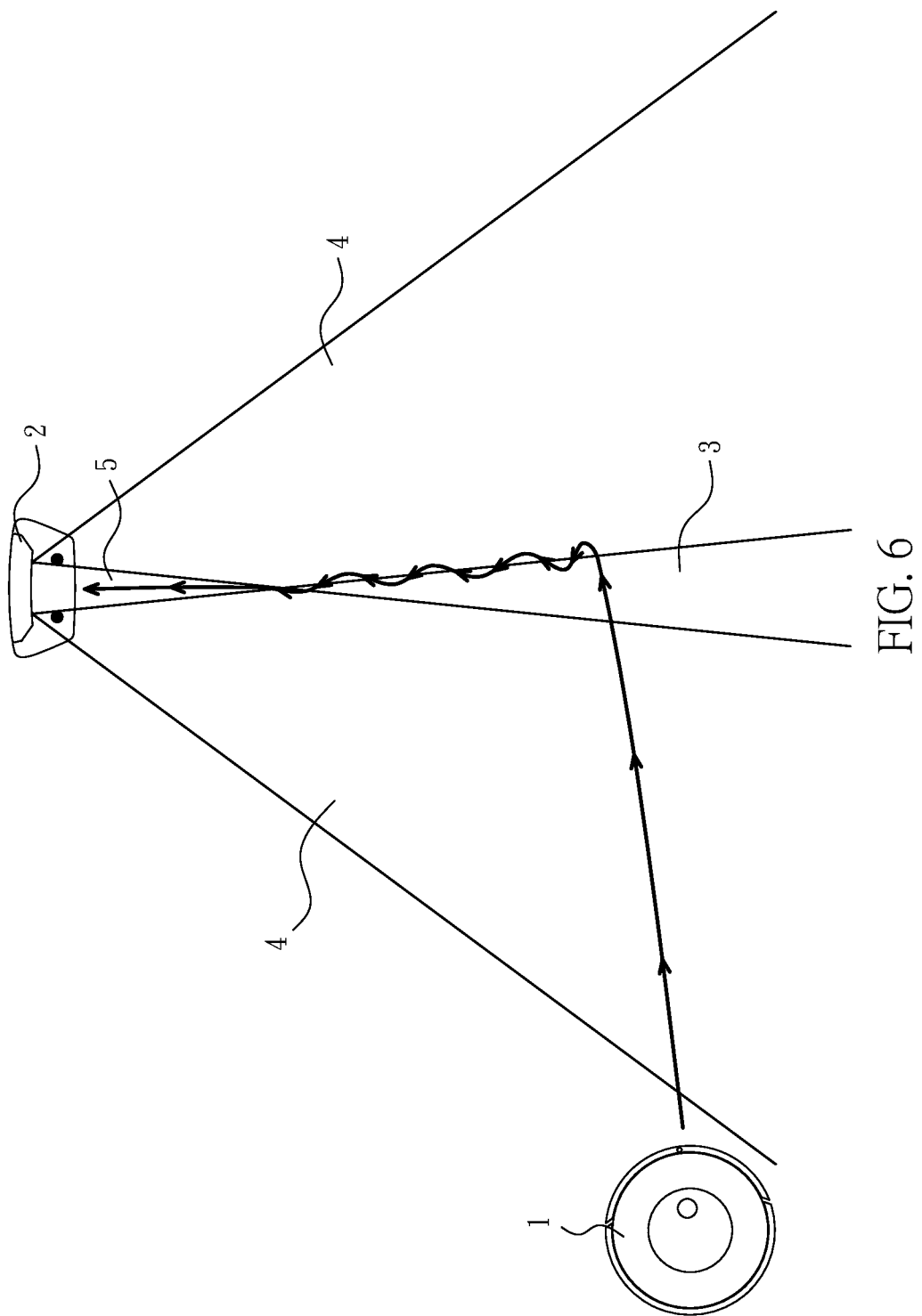
FIG. 6 a schematic view showing the robot movement of a fifth embodiment of the present invention.
Figure 7:
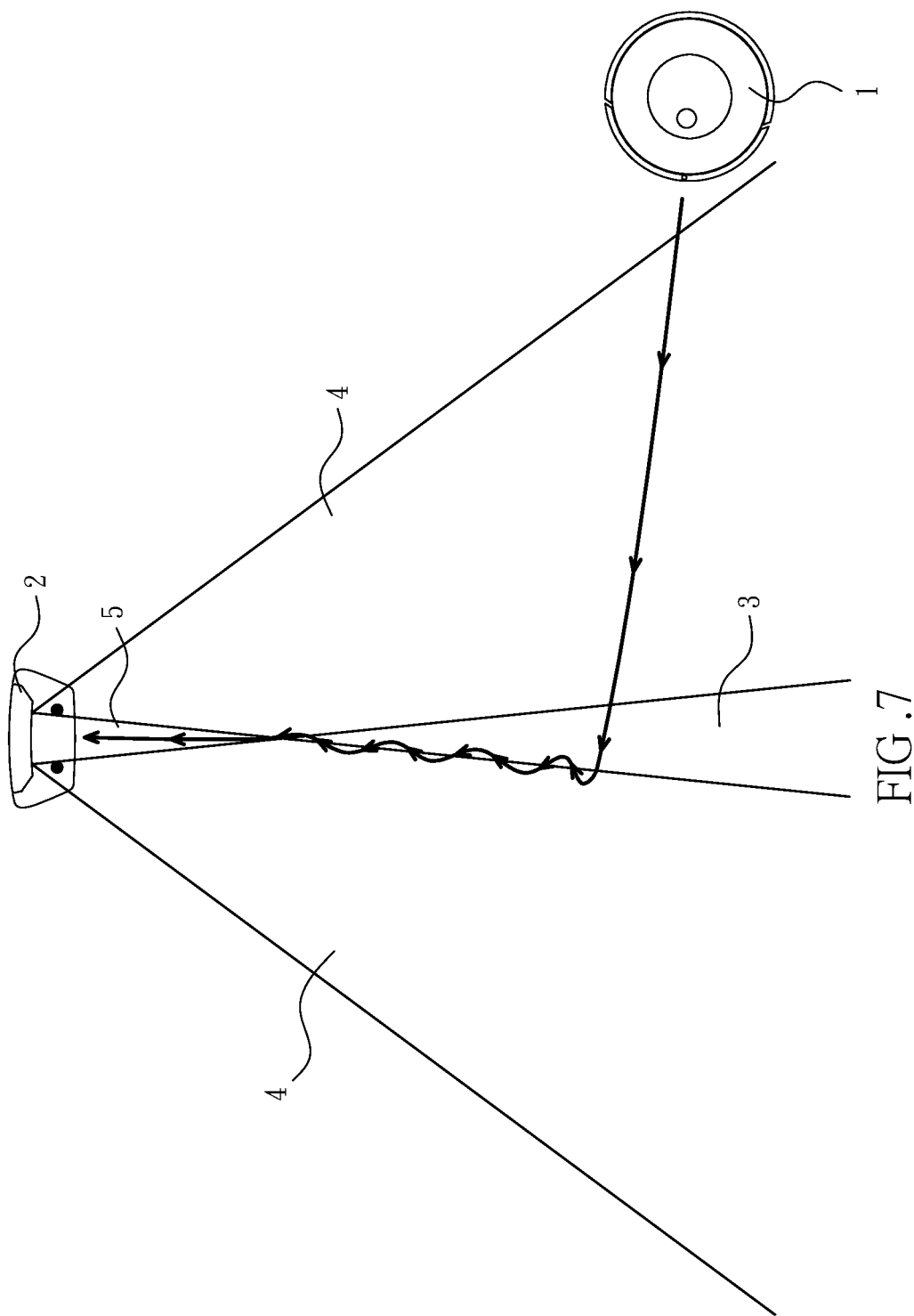
FIG. 7 a schematic view showing the robot movement of a sixth embodiment of the present invention.

In the fifth and sixth embodiments of the present invention, as shown in FIGS. 6 and 7, the fifth and sixth embodiments differ from the first and second embodiments in that the robot 1 enters one of the non-overlapping regions 43, and then the robot 1 moves in the direction of the other non-overlapping zone 43 and the charging station 2 until the robot 1 detects that it has passed through the overlapping zone 3 and enters the other overlapping zone 43, and then the robot 1 moves towards the overlapping zone 3 and the charging station 2 again. Afterwards, the robot 1 detects that it has entered the overlapping zone 3, and then moves towards the previous non-overlapping zone 43 and the charging station 2, thereby repeatedly moving in and out between the overlapping zone 3 and the non-overlapping zone 43 until the robot 1 moves to the blank zone 5. At this point, the robot 1 either moves directly towards the charging station 2, thereby allowing the robot 1 to dock at the charging station 2, or moves to the blank zone 5 and then rotates and moves backwardly towards the charging station 2, so that the robot 1 can dock at the charging station 2.

In the present invention, the robot 1 enters the overlapping zone 3 or any non-overlapping zone 43 and can detect the direction of the overlapping zone 3 or the non-overlapping zone 43; this is because the left transmitting signal or the right transmitting signal have different identification features. The identification features of the left and right transmit signals may be any one of different codes, different frequencies or signal phases, so that the robot 1 can distinguish the transmitting signals according to the identification features. Consequently, no matter the robot 1 first enters either the overlapping zone 3 or any non-overlapping zone 43, it can still continue moving correctly between overlapping zone 3 and relevant non-overlapping zone 43 to accomplish eventual docking at the charging station.

In summary, when the robot 1 needs to move to the charging station 2, the robot 1 can move to the charging station 2 with multiple choices of paths, in contrast to the prior art technique in which the robot 1 can only moves towards the overlapping zone 3 and then moves directly towards the charging station 2.

The present invention has been described with preferred embodiment of the present invention; however, this embodiment is not intended to limit the scope of the patent of the present invention. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

REFERENCE NUMERALS 1 robot
10 signal sensor
2 charging station
20 signal transmitter
3 overlapping zone
43 non-overlapping zone
5 blank zone

What is claimed is:

1. A method for docking a robot at a charging station, wherein the method is applied between the robot and the charging station; the charging station outputs a first transmitting signal and a second transmitting signal to form an overlapping zone and two non-overlapping zone within a transmission range of the two signals at a predetermined distance in front of the charging station, and a blank zone of the two signals is formed within the predetermined distance; when the robot moves to the charging station, the method comprising the following steps:

the robot detecting an entry of the robot into the overlapping zone or one of the two non-overlapping zones;
the robot alternately moving in and out continuously between the overlapping zone and one of the two non-overlapping zones in the direction towards the charging station; and
the robot moving towards the charging station when the robot arrives at the blank zone, to allow the robot docking at the charging station, or the robot rotating and moving backwardly towards the charging station when the robot arrives at the blank zone, to allow the robot to dock at the charging station,
wherein each one of the first and the second transmitting signals has at least one of different identification features, and each one of the identification features of the first and the second transmitting signals is a different code, a different frequency or a different signal phase; and each identification feature is provided for the robot identifying the first and the second transmitting signals to determine whether the robot is in the overlapping zone, the non-overlapping zone, or the blank zone;
wherein when the robot enters the overlapping zone or the non-overlapping zone, the robot firstly moves towards the charging station and alternately moves in and out continuously between the overlapping zone or the non-overlapping zone until the robot detects none of the transmitting signals, indicating that the robot moves into the blank zone, then the robot moves directly towards the charging station to dock at the charging station, or the robot rotates and moves backwardly towards the charging station, thereby allowing the robot to dock at the charging station.

2. The method for docking the robot at the charging station as claimed in claim 1, wherein the step of the robot moving in the direction of the charging station by alternately moving in and out continuously between the overlapping zone and one of the two non-overlapping zones comprising:

the robot entering a first non-overlapping zone, and the robot determining the location of a second non-overlapping zone;
the robot moving towards the overlapping zone and the charging station; and
the robot detects the entry into the overlapping zone, then the robot moving towards the first non-overlapping zone and the charging station, thereby alternately moving in and out continuously between the overlapping zones and the non-overlapping zones.

3. The method for docking the robot at the charging station as claimed in claim 1, wherein the step of the robot moving in the direction of the charging station by alternately moving in and out continuously between the overlapping zone and one of the two non-overlapping zones comprising:

the robot entering a first non-overlapping zone, and the robot determining the location of a second non-overlapping zone;

the robot moving towards the second non-overlapping zone and the charging station;

upon detecting the entry into the second non-overlapping zone, the robot moving towards the overlapping zone and the charging station; and upon detecting the entry into the overlapping zone, the robot moving toward the second non-overlapping zone and the charging station, thereby alternately moving in and out continuously between the overlapping zone and the non-overlapping zones.

4. The method for docking the robot at the charging station as claimed in claim 1, wherein the step of the robot moving in the direction of the charging station by alternately moving in and out continuously between the overlapping zone and one of the two non-overlapping zones comprising:

the robot entering the overlapping zone, and then moving to a first non-overlapping zone, thereby determining the location of the first non-overlapping zone and the overlapping zone; and the robot moving between the overlapping zone and the first non-overlapping zone, thereby alternately moving in and out continuously between the overlapping zone and the non-overlapping zones.

* * * * *